Jan. 16, 1962 J. M. PARKER 3,016,673
WRAPPING AND SEALING MACHINE
Filed Aug. 1, 1960 2 Sheets-Sheet 1

INVENTOR:
JOHN M. PARKER
BY
ATTORNEYS

Jan. 16, 1962  J. M. PARKER  3,016,673
WRAPPING AND SEALING MACHINE
Filed Aug. 1, 1960  2 Sheets-Sheet 2

INVENTOR:
JOHN M. PARKER
BY
ATTORNEYS

United States Patent Office 3,016,673
Patented Jan. 16, 1962

3,016,673
WRAPPING AND SEALING MACHINE
John M. Parker, 72 La Cuesta, Orinda, Calif.
Filed Aug. 1, 1960, Ser. No. 46,437
11 Claims. (Cl. 53—390)

This invention relates in general to a heat-sealing device and more particularly to a device which is capable of feeding a continuous sheet of thermoplastic film to a wrapping and sealing station whereat objects to be wrapped, such as sandwiches, are enclosed and sealed.

It is an object of this invention to provide a device which is suitable for feeding a continuous sheet of thermoplastic material to a wrapping station.

Still another object of this invention is to provide a device for wrapping objects with a thermoplastic material and heat-sealing such objects therein.

Other objects and advantages of this invention, if not specifically set forth, will become apparent during the course of the description which follows.

Generally, this invention comprises a device for feeding thermoplastic film in a predetermined quantity to an object to be wrapped, wrapping the thermoplastic film about the object and sealing the thermoplastic film along any free ends or edges thereof whereby to form a completely enclosed and sealed package. The device is provided with a supporting base and has means for supplying the desired thermoplastic film in a continuous sheet. Means are provided for gripping and advancing this continuous sheet in one direction only, the means incorporating a frame pivoted at a first end to the base. A handle is pivoted at the second end of the frame, the handle having a gripper member secured thereto, the gripper member paralleling the lead edge of the frame and serving to contact the leading edge of the frame when the handle is pivoted in a forward direction and moving away from the lead edge when the handle is pivoted in a rearward direction. There is provided on the lead edge of the frame a flange extending the entire width thereof, the flange extending at a right angle to the frame and extending downwardly from the frame when the frame is pivoted to a closed position. Mounted on the frame and on the base are cooperating heat-sealing elements, the elements being positioned to register one with the other as the first frame is pivoted toward the base. Means are provided at the forward end of the base for gripping thermoplastic material. Preferably, the means comprise a pair of horizontal rollers which are so positioned that the slot between them registers exactly with the aforementioned flange as the flange is lowered toward the rollers. In the preferred embodiment of the invention, a pair of elastic bands are provided for bridging the space between the two plates, the elastic bands tending to guide the thermoplastic film into the area occupied by the heat-sealing elements so as to assure a proper seal.

Figure 1:
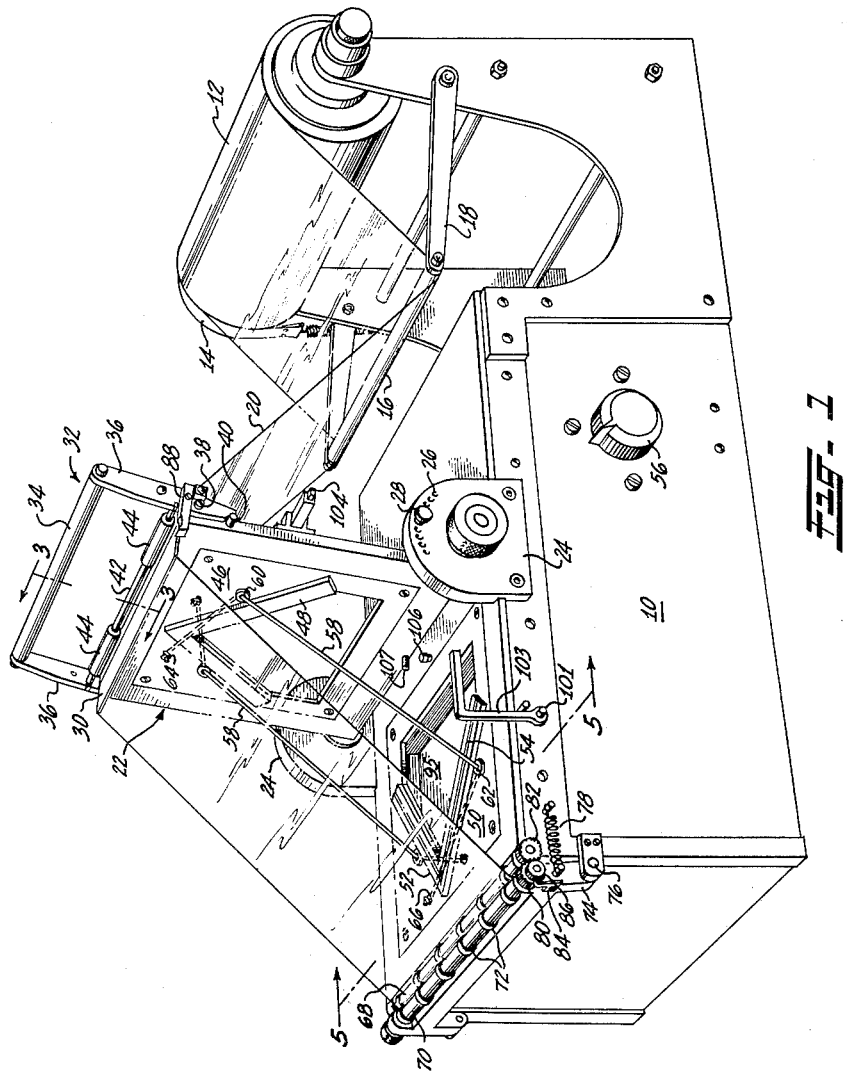
FIGURE 1 is a perspective view of the structure of this invention.

Referring now to the drawings wherein like characters refer to like parts throughout, there is shown a supporting base 10 having mounted transversely thereof a roll 12 of a suitable thermoplastic film, such as "Pliofilm." The roll is suitably journalled for rotation and provided with a suitable braking mechanism 14 which, as shown in FIGURE 1, may consist of a flexible metal strap and a spring tending to hold the strap in frictional engagement with an exposed portion of the core supporting roll 12. The braking mechanism is necessary to prevent the plastic wrapping material from pealing off in greater quantities than desired. A dancer bar 16 is supported by suitable brackets 18 in turn pivoted to the base 10. After passing beneath the dancer bar, the thermoplastic film 20 passes upwardly over the end of frame 22 which is suitably journalled for pivotal movement in bosses 24. The boss nearest the viewer in FIGURE 1 is provided with means for limiting the extent to which frame 22 is allowed to be swung in a clockwise direction. This consists of a series of holes 26 spaced along the periphery of the boss through which a pin 28 may be passed, the pin extending a sufficient distance beyond the inside edge of the boss to obstruct the passage of the frame as it is swung in a clockwise direction.

Figure 2:
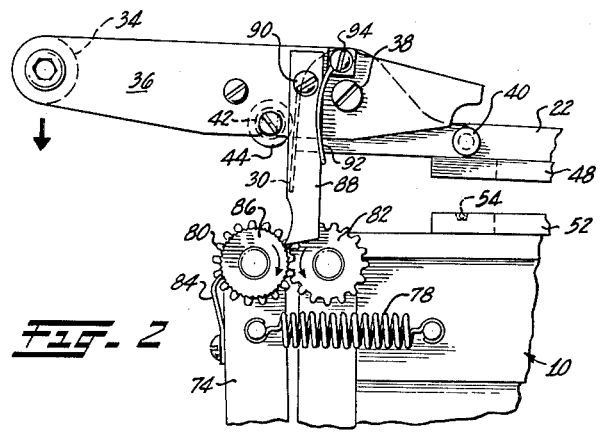
FIGURE 2 is an enlarged fragmentary side elevation of the front end of the machine, viewed at the time when sealing of the thermoplastic material is about to take place.
Figure 3:
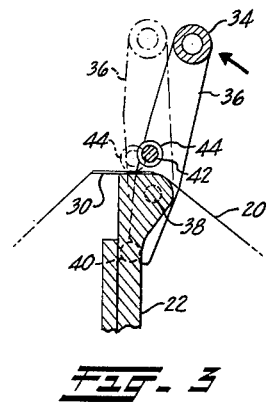
FIGURE 3 is an enlarged fragmentary side elevation taken through the line 3—3 of FIGURE 1, showing diagrammatically the means used to feed a predetermined quantity of thermoplastic material to the wrapping and sealing station.

Mounted on the free end of the frame 22, transversely thereof and extending at a right angle thereto, is flange 30. Pivoted along the longitudinal edges of the frame 22 is the handle and film gripping means, generally designated 32, which is shown in greater detail in FIGURES 2 and 3. This structure consists of a handle 34 mounted on a pair of brackets 36, pivoted at points 38 along longitudinal edges of the frame 22. Stop 40 limits the clockwise pivotal movement of the handle, as shown in FIGURE 3. Bridging the space between the brackets 36 and supported thereby is rod 42 which is preferably provided with rubber sleeves 44, thus to assure a positive gripping action on the thermoplastic material which is passed between flange 30 and rod 42. As shown in FIGURE 3, when the handle is swung in a counter-clockwise direction, the brackets 36 pivot so as to cause the rod 42 to move generally downwardly, thereby to grip the thermoplastic material 20 between the rubber sleeves 44 and the face of the flange 30. Thus, as handle 34 and frame 22 are swung in a counter-clockwise direction, the thermoplastic film 20 will be pulled from the roll 12 and advanced to the wrapping and sealing station in a quantity dependent upon the extent to which the frame 22 has been pivoted in a clockwise direction prior to the beginning of the operation.

Figure 4:
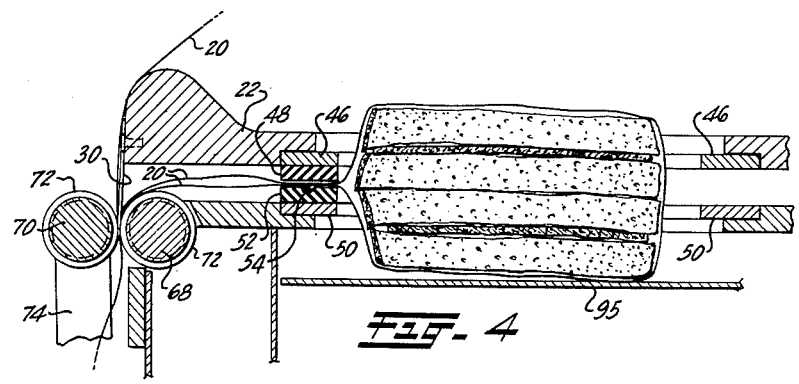
FIGURE 4 is an enlarged sectional side elevation showing the means by which any free ends of thermoplastic film are gripped and removed from the wrapping and sealing station and by which retrograde movement of the film is prevented.

Frame 22 has temporarily mounted therein a plate 46 to which are secured strips 48 of a resilient heat-resistant material such as silicone rubber. A preferred embodiment of the invention involves two silicone rubber strips positioned to form a V, with the apex thereof pointing toward the front of the machine when the plate is pivoted in a maximum counter-clockwise direction as shown in FIGURES 2 and 4. Plate 46 may be removed and replaced with another plate having a different arrangement of silicone rubber strips. Thus, while the present machine is especially designed for the wrapping of triangular sandwich sections, the machine may be modified to its use in the wrapping of rectangular sandwich sections, hot dogs, rolls, or other products.

A second plate 50 of about the size and shape of plate 46 and having a cut-out area at the center thereof is also temporarily secured in the base 10. Fixed on this plate are silicone rubber strips 52 having a nickel chromium wire 54 along the upper surface thereof. A suitable rheostat, the control knob 56 of which may be seen in FIGURE 1, is provided for adjusting the current supplied the wire 54. Power is supplied from a source, not shown.

Important features where triangular objects are wrapped are elastic guides 58. Preferably, the elastic is passed through holes 60 and 62 in the plates 46 and 50, respectively, and thereafter passed above or beneath the plates, finally passing back through additional holes 64 and 66 in the plates 46 and 50 and being secured therein by means of knots. It is necessary to pass the elastic material behind the plates in this manner so that it will remain relatively taut even when handle 34 is swung in a counter-clockwise direction to the point shown in FIGURE 2. The function of the guides 58 is to force the thermoplastic film toward the front of the device as frame 22 is pivoted in a counter-clockwise direction, thus to assure that free edges and ends of the thermoplastic material fall between the silicone rubber strips 48 and 52.

Mounted on the front end of the machine is a means for gripping the thermoplastic film so as to hold the leading edge thereof against retrograde movement. In the preferred embodiment of the invention, a pair of rollers 68 and 70 are spaced from one another to an extent determined by the thickness of the rubber rings 72. Roller 68 is journalled on the front end of the machine while roller 70 is journalled on a bracket 74 which in turn is pivoted at 76 to the base 10. A spring 78 is secured to the bracket and to the base so as to urge roller 70 toward roller 68. The rollers are provided with intermeshing gears 80 and 82 and a resilient detent 84 serves to prevent turning of gear 80 in a counter-clockwise direction. Mounted at the extreme end of roller 70 is a second gear 86 which is positioned to register with pawl 88 pivoted on handle bracket 36 at point 90. Spring 92 cooperates with stop 94, also mounted on bracket 36, to guide the pawl 88 so that it contacts gear 86, as shown in FIGURE 2, thus to cause the gear to rotate in a clockwise manner when frame 22 is pivoted counter-clockwise.

In place of the preferred structure described immediately above, it is possible to dispense with roller 68, thus to permit the rubber rings 72 of roller 70 to bear directly against the lip of base 10 at the point occupied by the roller 68.

Figure 5:
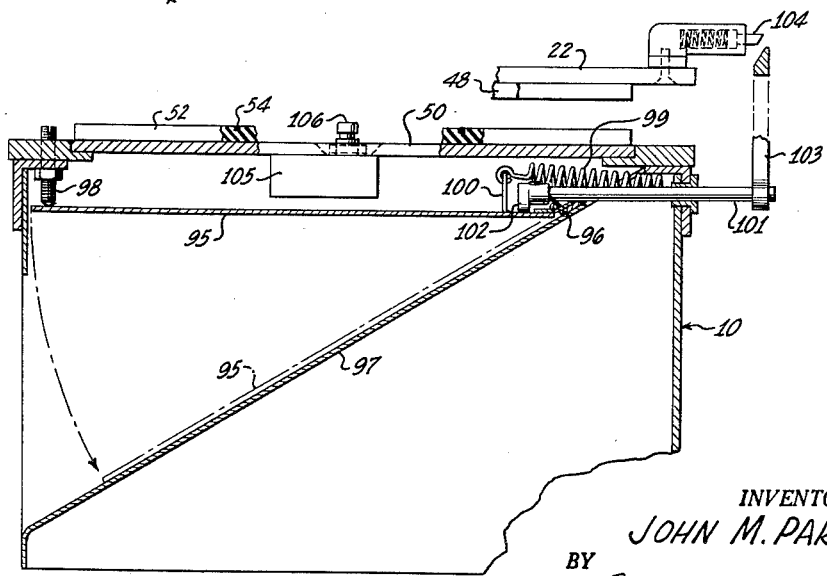
FIGURE 5 is an enlarged, fragmentary end elevation, in section, taken through the line 5—5 of FIGURE 1.

A temporary support 95 for the material being wrapped is shown in FIGURE 5. The support is pivoted by means of hinge 96 to the base 10. When the support is pivoted downwardly, as shown in phantom view in FIGURE 5, it directly overlies the inclined ramp 97 so that when the platform is depressed, the wrapped product will drop from the wrapping station. When the platform is closed, its upward movement is limited by the stop 98. Spring 99 is secured to bracket 100 at one end and to the frame at the other and serves to return the support 95 to a closed position after the product has been ejected. Rotatably mounted in the side wall of base 10 is a rod 101 which has a cam 102 secured on the inner end thereof. The cam bears against support 95 so that as the rod 101 rotates, the support 95 will be depressed. Secured to the exposed end of rod 101 is L-shaped lever arm 103 which is positioned to cooperate with spring-loaded detent 104, in turn mounted on frame 22. It will be seen that as the frame 22 is rotated in a counter-clockwise direction, as seen in FIGURE 1, the detent will strike the beveled surface of the lever arm, thus to be retracted so as to permit the detent to pass inside of lever arm 103 and then return to its original extended position beneath the lowermost horizontal edge of the lever arm. Thereafter, when frame 22 is swung clockwise, the detent 104 will force the L-shaped lever arm in a counter-clockwise direction, thus to cause cam 102 to depress the support 95.

Connected in series with the chromium nickel wire 54 is a normally open momentary contact-type switch 105 of conventional design having pin 106 thereon, which pin may be actuated by detent 107 supported by the frame 22. It will be seen that this provides means for supplying current to the nickel chromium wire 54 at a time immediately prior to the need therefor.

In operation, flexible thermoplastic material 20 is fed from the roll beneath the dancer bar 16 between flange 30 and rod 42 and finally between rollers 68 and 70. The article to be wrapped is rested on top of the film in the area directly above the lowermost plate 50. The handle 34 is then swung counter-clockwise and the weight of the article permits the thermoplastic material, gripped between the front surface of flange 30 and the rubber sleeves 44, to be wrapped over the article. The article, e.g. two superimposed triangular sandwich halves, rests in the well formed directly behind the rubber strips 52 and as the handle 34 is moved in a counter-clockwise direction, the elastic members 58 guide the thermoplastic material so that, excepting along the rearward fold, the two thicknesses overlie the rubber strip 52 containing the nickel chromium wire 54. As the frame 22 swings to a closed position, the dog 104 passes the horizontal portion of the lever 103 and snaps to its maximum extended position therebeneath and, simultaneously, the leading edge of flange 30 registers with the slot formed between rollers 68 and 70. As the thermoplastic film has been folded beneath the flange edge by the weight of the article being wrapped, it will be seen that the film is forced between the rollers and gripped therebetween while the detent 88 rotates the rollers to an extent sufficient to grip the leading edge of film and remove loose pieces of film from the vicinity of the nickel chromium wire and the rubber strips. Pin 107 actuates switch 105, and sufficient current is supplied the wire 54 simultaneously to fuse and to sever the thermoplastic film along the open edges thereof. The article, no longer supported by the continuous sheet of thermoplastic, drops into the well behind the rubber strips 52 and as the handle 34 is rotated in a clockwise direction, lever 101 is tripped and positive trap door action of support 95 is assured. When handle 34 is moved clockwise, the thermoplastic film is gripped between rollers 68 and 70 and allowed to slide between rubber sleeves 44 and the front surface of the flange 30 so that the thermoplastic film is neither advanced nor withdrawn as frame 22 is returned to its rest position. If a longer throw of the frame 22 is desired, the pin 28 can be moved clockwise. As the quantity of thermoplastic film advanced in any one cycle is determined by the distance from the roller 70 to the flange 30, it is seen that as the angle between the plates 50 and 46 becomes progressively more obtuse, the quantity of thermoplastic provided at the wrapping station will be increased. Thus, it is possible to accommodate articles of differing sizes and shapes requiring greater or lesser quantities of wrapping material.

Obviously, many modifications and variations may be made without departing from the spirit and scope of this invention and therefore only such limitations should be imposed as are indicated in the appended claims.

I claim:

1. A device for feeding a thermoplastic film to an object to be wrapped, wrapping said object and sealing the thermoplastic film thereabout comprising: a base; means supplying said thermoplastic film in a continuous sheet, means for gripping an end of said sheet and advancing said sheet in a single direction only comprising a first member pivoted at one end thereof to the said base, said first member having a second member pivoted to the second end thereof, the said second member extending substantially the width of the first member, the said second member contacting said first member when the said second member is pivoted in a direction away from the means supplying the said thermoplastic material and moving away from said first member when said second member is pivoted in a direction toward the means supplying the said thermoplastic material; a flange extending laterally of the said first member, said flange extending generally at a right angle from the second end thereof; cooperating heat-sealing elements mounted on the said first member and on said base, the said heat-sealing elements being positioned to register one with the other as the said first member is pivoted toward the said base; and means at the end of the said base farthest removed from the said means supplying the said thermoplastic film for gripping said thermoplastic film when said thermoplastic film is fed thereto, said means forming a slot for the frictional engagement of the said thermoplastic film, said slot being so positioned that, when the said first member is pivoted to a closed position, the said flange will register with the said slot and force the said thermoplastic film into the said slot.

2. A device for feeding a thermoplastic film to an object to be wrapped, wrapping said object and sealing the thermoplastic film thereabout comprising: a base; means supplying said thermoplastic film in a continuous sheet, said means being positioned at the rear of the said base; means for gripping an end of the said sheet and advancing said sheet in a single direction only comprising a first member pivoted at one end thereof to the said base, said first member having a handle pivoted to a second end thereof, the said handle having a second member secured thereto extending substantially the width of said first member, the said second member contacting said first member when the said handle is pivoted in a direction away from the means supplying the thermoplastic material and moving away from the said first member when the said handle is pivoted in a direction toward the means supplying the said thermoplastic material; a flange extending laterally of the said first member, said flange extending at a generally right angle thereto from the said second end thereof; cooperating heat-sealing elements mounted on the said first means and on said base, the said heat-sealing elements being positioned to register with one another as the said first member is pivoted toward the said base; and means at the end of the said base farthest removed from the said means supplying the said thermoplastic film for gripping said thermoplastic film when said thermoplastic film is fed thereto, said gripping means comprising at least a single roller positioned closely adjacent the said base and a second cooperating means positioned between the first roller and the said base, the said roller and the said second cooperating means forming a narrow slot therebetween, said slot being so positioned that when said handle is pivoted away from said means supplying said thermoplastic material, the said flange will register with the said slot and force said thermoplastic material into the said slot.

3. The structure of claim 2 wherein a pair of elastic bands are stretched between the said base and the said first member and are secured thereto at either end, the said elastic bands being so positioned as to guide the said thermoplastic material between the said heat-sealing elements.

4. The structure of claim 2 wherein said heat-sealing elements on the said first member and on the said base are each arranged to form a V with each apex thereof extending toward the said roller.

5. The structure of claim 2 wherein the said cooperating means comprises a second roller mounted for rotation on the said base and wherein the said first member is provided with a detent for engaging one of the said rollers and rotating the said roller as the first member is advanced toward the said roller, the said detent advancing the said roller in a direction such that thermoplastic film gripped between the said rollers is advanced therebetween.

6. A device for feeding a thermoplastic film to an object to be wrapped, wrapping said object and sealing the thermoplastic film thereabout comprising: a base; means for supplying said thermoplastic film in a continuous sheet, said means being positioned at the rear of the said base; means for gripping an end of the said sheet and advancing said sheet in a single direction only comprising a planar member pivoted at one end thereof to the said base; a pair of brackets, one pivoted along either longitudinal edge of the said planar member at the second end thereof; a handle joining the said brackets; a first member extending between the said brackets and being positioned closely adjacent the said planar member whereby when the said handle is pivoted in a direction toward the said means supplying the said thermoplastic material, the said first member will move away from the said planar member and whereby when the said handle is pivoted away from the said means supplying the said thermoplastic material, the said first member will contact the said planar member; a flange extending substantially the full width of the second end of the said planar member, said flange extending generally at a right angle from the said second end of the said planar member; cooperating heat-sealing elements mounted on the said planar member and on the said base, the said heat-sealing elements being positioned to register one with the other as the said planar member is pivoted toward the said base; and means at the end of the said base farthest removed from the said means supplying the said thermoplastic film for gripping said thermoplastic film when said thermoplastic film is fed thereto, said gripping means comprising a bracket pivoted to the said base, a roller mounted on the said bracket, the said roller extending laterally of the said base, means urging the said bracket toward the said base whereby a slot is formed between the said roller and the said base, said slot being so positioned that, when said handle is pivoted away from the said means supplying the said thermoplastic film, said flange will register with the said slot and force said thermoplastic film into the said slot, a cut-out area in the said base of sufficient size to allow for the passage of said object to be wrapped, said cut-out area being positioned adjacent the said heat-sealing element of the said base, and a spring-loaded temporary support plate positioned directly beneath the said cut-out area, the said spring being secured at one end thereof to the said plate and at the other end thereof to the said base, said spring being of sufficient strength to return said plate to a horizontal position when weight is removed from said temporary support plate.

7. The structure of claim 6 wherein means are provided for depressing the temporary support plate, said means comprising a cam positioned adjacent the said temporary support plate and means mounted on the said planar member for rotating the said cam as the said planar member is moved in a direction toward the said means supplying the said thermoplastic film.

8. A device for feeding a wrapping material to an object to be wrapped and wrapping said object comprising: a base; means supplying said wrapping material in a continuous sheet, means for gripping an end of said sheet and advancing said sheet in a single direction only comprising a first member pivoted at one end thereof to the said base, said first member having a second member pivoted to the second end thereof, the said second member extending substantially the width of the first member, the said second member contacting said first member when the said second member is pivoted in a direction away from the means supplying the said wrapping material and moving away from said first member when said second member is pivoted in a direction toward the means supplying the said wrapping material; a flange extending laterally of the said first member, said flange extending generally at a right angle from the second end thereof; and means at the end of the said base farthest removed from the said means supplying the said wrapping material for gripping said wrapping material when said wrapping material is fed thereto, said gripping means forming a slot for the frictional engagement of the said wrapping material, said slot being so positioned that, when the said first member is pivoted to a closed position, the said flange will register with the said slot and force the said wrapping material into the said slot.

9. A device for feeding a thermoplastic film to an object to be wrapped, wrapping said object and sealing the thermoplastic film thereabout comprising: a base; means supplying said thermoplastic film in a continuous sheet, said means being positioned at the rear of the said base; means for gripping an end of the said sheet and advancing said sheet in a single direction only comprising a first member pivoted at one end thereof to the said base, said first member having a handle pivoted to a second end thereof, the said handle having a second member secured thereto extending substantially the width of said first member, the said second member contacting said first member when the said handle is pivoted in a direction away from the means supplying the thermoplastic material and moving away from the said first member when the said handle is pivoted in a direction toward the means supplying the said thermoplastic material; a flange extending laterally of the said first member, said flange extending at a generally right angle thereto from the said second end thereof; cooperating heat-sealing elements mounted on the said first means and on said base, the said heat-sealing elements being positioned to register with one another as the said first member is pivoted toward the said base; and means at the end of the said base farthest removed from the said means supplying the said thermoplastic fi'm for gripping said thermoplastic film when said thermoplastic film is fed thereto, said gripping means comprising a single roller positioned closely adjacent the lip of said base whereby to form a slot therebetween, said slot being so positioned that when said handle is pivoted away from said means supplying said thermoplastic material, the said flange will register with the said slot and force said thermoplastic material into said slot.

10. A device for wrapping an object in a thermoplastic film and sealing the thermoplastic film thereabout comprising: a base; means supplying said thermoplastic film; a first member pivoted at a first end thereof to a first end of said base, said first member having film gripping means secured to a second end thereof; means on said base for gripping the said thermoplastic film, said means being positioned at the second end of said base; elastic bands stretched between the said base and the said first member and secured to said base and said first member at opposite ends of said elastic members, the said elastic bands being so positioned as to guide the said thermoplastic film.

11. A device for wrapping an object in a thermoplastic film and sealing the thermoplastic film thereabout comprising: a base; means supplying said thermoplastic film; a first member pivoted at a first end thereof to a first end of said base, said first member having film gripping means secured to a second end thereof; means on said base for gripping the said thermoplastic film, said means being positioned at the second end of said base; cooperating heat-sealing elements mounted on the said first member and on the said base, said heat-sealing elements being positioned to register with one another as the said first member is pivoted toward the said base; elastic bands stretched between the said base and the said first member and secured to said base and said first member at opposite ends of said elastic members, the said elastic bands being so positioned as to guide the said thermoplastic film between the said heat-sealing elements.

No references cited.